United States Patent [19]
Hiyama

[11] Patent Number: 4,963,059
[45] Date of Patent: Oct. 16, 1990

[54] ROTARY CUTTING TOOL

[75] Inventor: Nobuo Hiyama, Utsunomiya, Japan

[73] Assignee: Izumo Industrial Co., Ltd., Japan

[21] Appl. No.: 317,067

[22] Filed: Feb. 24, 1989

Related U.S. Application Data

[63] Continuation of Ser. No. 18,349, Feb. 24, 1987, abandoned.

[30] Foreign Application Priority Data

| Feb. 28, 1986 | [JP] | Japan | 61-43459 |
| Sep. 30, 1986 | [JP] | Japan | 61-231694 |
| Sep. 30, 1986 | [JP] | Japan | 61-231695 |
| Oct. 2, 1986 | [JP] | Japan | 61-235413 |
| Oct. 23, 1986 | [JP] | Japan | 61-252172 |

[51] Int. Cl.$^5$ ............................................. B23C 5/00
[52] U.S. Cl. ....................................... 407/60; 407/62; 407/11
[58] Field of Search ............... 407/54, 59, 63, 60, 407/61, 62, 40, 42, 34

[56] References Cited

U.S. PATENT DOCUMENTS

| 1,019,564 | 3/1912 | Unterloff | 407/63 |
| 1,948,057 | 2/1934 | Tscherne | 407/59 |

FOREIGN PATENT DOCUMENTS

| 3413290 | 10/1985 | Fed. Rep. of Germany . | |
| 1334196 | 9/1962 | France | 407/63 |
| 30-3897 | 6/1955 | Japan . | |
| 30-5244 | 7/1955 | Japan . | |
| 0625848 | 9/1978 | U.S.S.R. | 407/63 |
| 0631271 | 11/1978 | U.S.S.R. | 407/54 |

OTHER PUBLICATIONS

"Milling and Design of Milling Cutter", published by Ohkouchi Shupann, 4th edition, 1969, pp. 145 and 146.

*Primary Examiner*—Frederick R. Schmidt
*Assistant Examiner*—Blynn Shideler
*Attorney, Agent, or Firm*—Scully, Scott, Murphy & Presser

[57] ABSTRACT

A rotary cutting tool includes a body having a cutting portion and an axis of rotation therethrough. The body has a plurality of helical flutes formed in a circumferential surface of the cutting portion in circumferentially spaced relation to one another and extending helically axially of the cutting portion so as to define a plurality of helical lands of a generally uniform land width spaced circumferentially of the cutting portion from one another. The body has a plurality of helical peripheral cutting edges each defined by a portion of an inner surface of a respective one of the helical flutes facing in a direction of rotation of the body and a surface of the land adjacent to the portion of the inner surface. At least one of the peripheral cutting edges has a helix angle different from helix angles of the other peripheral cutting edges. The peripheral cutting edges are equally spaced circumferentially of the body in at least one plane disposed perpendicularly to the axis of rotation of the body.

22 Claims, 8 Drawing Sheets

FIG. 9
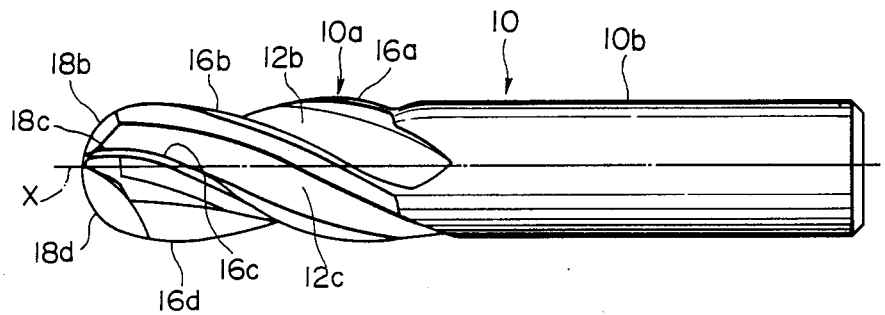
FIG. 10
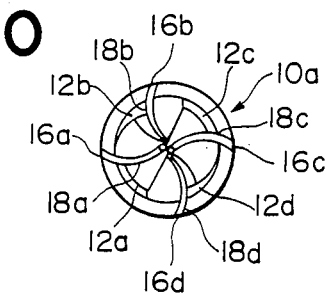
FIG. 11          FIG. 12
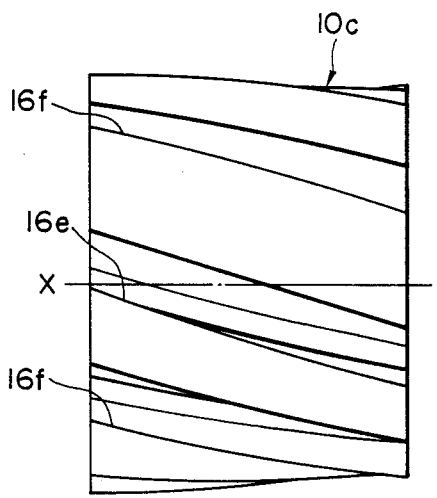 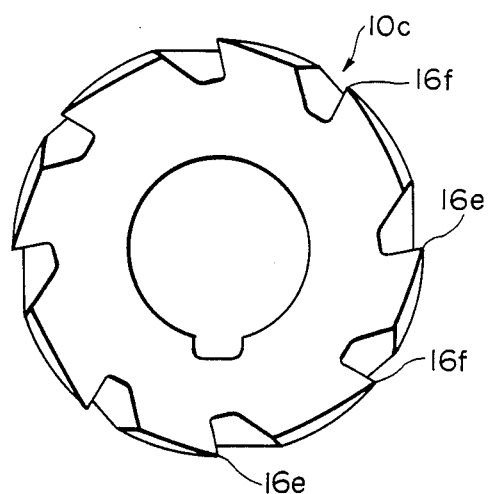

ROTARY CUTTING TOOL

This application is a continuation of application Ser. No. 018,349, filed Feb. 24, 1987, now abandoned.

BACKGROUND OF THE INVENTION

1. Field of the Invention

The present invention relates to a rotary cutting tool having a plurality of helical peripheral cutting edges with unequal helix angles formed on a circumferential surface of a tool body.

2. Prior Art

One conventional end mill disclosed in Japanese Patent Publication No. 30-5244 includes a plurality of helical peripheral cutting edges formed on a circumferential surface of a tool body at its forward portion and having helix angles different from one another so that circumferential pitches of the peripheral cutting edges are different from one another in any plane perpendicular to an axis of rotation of the tool body. In such an end mill, the respective cutting edges have been subjected to cutting loads exerted in different directions for different time intervals. Accordingly, the end mill is not susceptible to a vibration having such a frequency that the end mill is resonated with the machine tool, and therefore the end mill is prevented from being subjected to chattering, resulting in an improvement of the cutting performance.

The end mill, however, has a drawback of taking much time and skill for its manufacture. In addition, its cutting performance has not been sufficient mainly because chips produced during cutting operation are not removed smoothly.

SUMMARY OF THE INVENTION

It is therefore an object of the present invention to provide an improved rotary cutting tool which can be easily manufactured and which has sufficiently excellent cutting performance.

According to the present invention, there is provided a rotary cutting tool comprising a body having a cutting part and an axis of rotation therethrough, the body having a plurality of helical flutes formed in a circumferential surface of the cutting part in circumferentially spaced relation to one another and extending helically axially of the cutting part so as to define a plurality of helical lands of a generally uniform land width spaced circumferentially of the cutting part from one another, the body having a plurality of helical peripheral cutting edges each defined by a portion of an inner surface of a respective one of the helical flutes facing in a direction of rotation of the body and a surface of the land adjacent to the portion of the inner surface, at least one of the peripheral cutting edges having a helix angle different from helix angles of the other peripheral cutting edges, the peripheral cutting edges being equally spaced circumferentially of the body in at least one plane disposed perpendicularly to the axis of rotation of the body.

BRIEF DESCRIPTION OF THE DRAWINGS

FIG. 9 is a view similar to FIG. 1, but showing a further modified cutting tool;

FIG. 10 is a view similar to FIG. 2, but showing the cutting tool of FIG. 9;

FIG. 11 is a view similar to FIG. 1, but showing a further modified cutting tool;

FIG. 12 is a view similar to FIG. 2, but showing the cutting tool of FIG. 11;

DESCRIPTION OF PREFERRED EMBODIMENTS OF THE INVENTION

Figure 1:
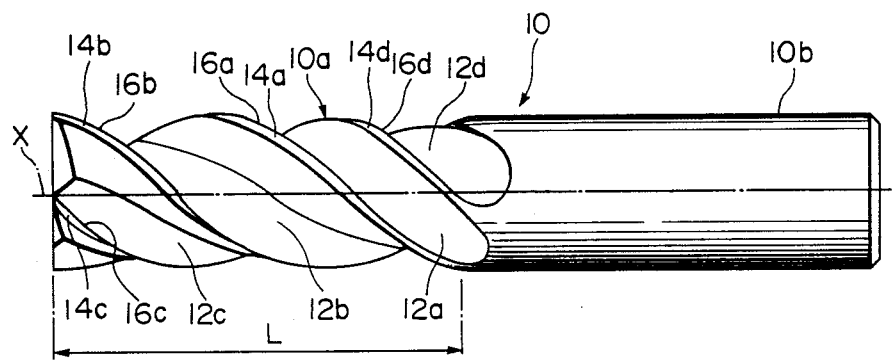
FIG. 1 is a side-elevational view of a rotary cutting tool in accordance with the present invention.

Various embodiments of the present invention will now be described with reference to the accompanying drawings in which like reference characters denote corresponding parts in several views.

Figure 2:
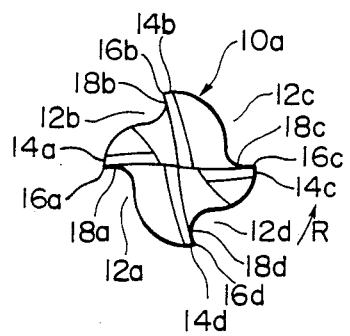
FIG. 2 is an end view of the cutting tool of FIG. 1.
Figure 3:
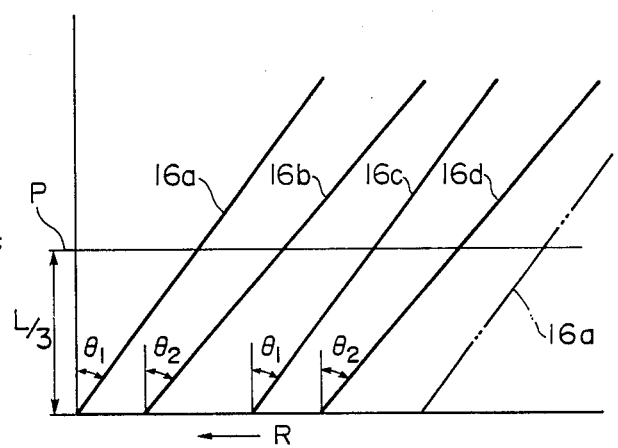
FIG. 3 is a schematic development view of the cutting tool of FIG. 1, showing the disposition of peripheral cutting edges.

FIGS. 1 to 3 show a four-flute end mill in accordance with a first embodiment of the present invention which comprises an elongated tool body 10 having a cutting part 10a at its forward end and a shank portion 10b at its rearward end, the shank portion 10b being adapted to be fixedly secured to a machine spindle so that the body 10 can be rotated in the direction of the arrow R about an axis X therethrough. The body 10 may be made of high speed steel, cemented carbide, cermet or the like. Four helical flutes or grooves 12a, 12b, 12c and 12d are formed in a circumferential surface of the cutting part 10a in circumferentially spaced relation to one another and extend helically axially of the cutting part 10a so that four helical lands 14a, 14b, 14c and 14d spaced circumferentially from one another are defined on the circumferential surface. The end mill has four helical peripheral cutting edges 16a, 16b, 16c and 16d each defined by that portion of an inner surface of a respective one of the flutes facing in the direction of rotation of the body 10 and a surface of the land adjacent thereto.

The two peripheral cutting edges 16a and 16c disposed in diametrically opposite relation are provided with the same helix angle $\theta_1$, and the other two peripheral cutting edges 16b and 16d are provided with the same helix angle $\theta_2$, the helix angle $\theta_2$ being selected to be greater than the helix angle $\theta_1$. For such an end mill having a diameter D of about 20 mm and a length L of cut shorter than 3D, the helix angles $\theta_1$ and $\theta_2$ should be preferably selected so as to satisfy the following relationship:

$$|\theta_1 - \theta_2| = 1° \text{ to } 10°$$

The peripheral cutting edges 16a to 16d are equally spaced circumferentially of the body 10 in a plane P disposed perpendicularly to the axis X and spaced from the forward end of the body 10 by a distance of one third of the length L of cut. Thus, the two peripheral cutting edges 16a and 16c as well as the other two peripheral cutting edges 16b and 16d are symmetrical with respect to the axis X. In view of the fact that only that portion of the cutting part 10a which portion extends from the forward end of the body to a point spaced rearwardly from the forward end by a distance of about two thirds of the length of cut is usually utilized actually to cut a workpiece, the plane P in which the peripheral cutting edges are equally spaced circumferentially generally corresponds to the center of the length of the portion of the cutting part to be actually utilized. The lands have the same land width which is generally uniform along the entire length thereof. Accordingly, the two flutes 12a and 12c corresponding to the peripheral cutting edges 16a and 16c with the helix angle $\theta_1$ have a flute width gradually decreasing from the forward end of the body 10 toward the shank portion thereof, and the other two flutes 12b and 12d corresponding to the peripheral cutting edges 12b and 12d with the helix angle $\theta_2$ have a flute width increasing gradually from the forward end of the body 10 toward the shank portion, the flutes 12a to 12d having the same width in the plane P.

The end mill also includes four end cutting edges 18a, 18b, 18c and 18d formed on a forward end face of the body 10 in circumferentially spaced relation to one another. Each end cutting edge intersects at its outer end a respective one of the peripheral cutting edges at its forward end and extends generally radially inwardly of the body 10 to the axis X. In the illustrated embodiment, each end cutting edge is formed in a concavely arcuate shape when viewed from the forward end of the body 10 to thereby improve the cutting performance.

In the end mill described above, since the helix angle $\theta_1$ of the two peripheral cutting edges 16a and 16c is selected to be smaller than the helix angle $\theta_2$ of the other two peripheral cutting edges 16b and 16d, the circumferential and axial distances between the adjacent two peripheral cutting edges 16a and 16b and the circumferential and axial distances between the adjacent two peripheral cutting edges 16c and 16d are increased gradually from the forward end of the body 10 toward the shank portion thereof while the circumferential and axial distances between the adjacent two peripheral cutting edges 16b and 16c and the circumferential and axial distances between the adjacent two peripheral cutting edges 16d and 16a are decreased gradually. Accordingly, although vibrations might be induced by the respective pairs of peripheral cutting edges during cutting operation, the frequency of the vibration induced by the two peripheral cutting edges 16a and 16c would be different from that of the vibration induced by the other two peripheral cutting edges 16b and 16d, and therefore the both vibrations would be canceled by each other, thereby preventing the end mill from being subjected to a vibration having such a frequency as to cause a resonance. Therefore, the end mill is prevented from being subjected to such vibration or chattering as to adversely affect the surface finish.

In an end mill having helical peripheral cutting edges with unequal helix angles, if the peripheral cutting edges should be disposed so as to have circumferential pitches different from one another in any plane perpendicular to the axis of the body, as is the case with the prior art end mill, much time and skill would be required for the manufacture of the end mill since there is no reference plane in which the peripheral cutting edges are circumferentially equally spaced. In the aforementioned end mill, however, the peripheral cutting edges are equally spaced circumferentially of the body in the plane P disposed perpendicularly to the axis X and spaced from the forward end of the body by one third of the length of cut. Accordingly, upon forming the peripheral cutting edges on the circumferential surface of the body, the disposition of the peripheral cutting edges in the plane P is first determined, and then the courses of the remaining portions of the peripheral cutting edges on the circumferential surface can be determined by making reference to the disposition of the peripheral cutting edges in the plane P. Therefore, the peripheral cutting edges of the aforementioned end mill can be formed more easily than those of the prior art end mill.

In addition, in the aforementioned end mill, since the two flutes 12b and 12d have a flute width gradually increasing from the forward end of the body 10 toward the shank portion thereof, chips produced by the peripheral cutting edges 16b and 16d are removed through the flutes 12b and 12d very easily. On the other hand, since the other two flutes 12a and 12c have a flute width gradually decreasing from the forward end of the body toward the shank portion, the chips might be stuck in the flutes 12a and 12c at their rearward ends, resulting in adversely affecting the cutting performance. The aforementioned end mill, however, is of such a construction that the peripheral cutting edges are equally spaced circumferentially of the body at a position spaced from the forward end of the body by a distance of one third of the length of cut, and therefore the width of the flutes at their rearward ends is relatively great as compared with the prior art end mill. Accordingly, the chips produced during the cutting operation can be removed sufficiently smoothly, thereby improving the cutting performance substantially.

Figure 4:
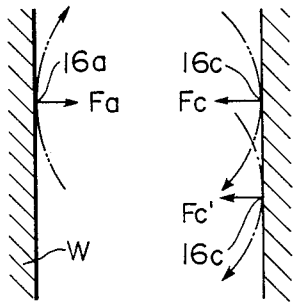
FIG. 4 is an explanatory view showing the cutting force exerted on a cutting tool during cutting operation.

Further, since in the aforementioned end mill, the two peripheral cutting edges 16a and 16c with the helix angle $\theta_1$ as well as the other two peripheral cutting edges 16b and 16d with the helix angle $\theta_2$ are symmetrical with respect to the axis X, the end mill is superior in the cutting performance to the prior art end mill having peripheral cutting edges with unequal helix angles. The reason will be hereinafter described with reference to FIG. 4 in which back forces exerted on the two peripheral cutting edges 16a and 16c during forming a groove in a workpiece W are schematically shown. If the two peripheral cutting edges 16a and 16c disposed in diametrically opposite relation should not be symmetrical with respect to the axis of the body, as is the case with the prior art end mill, the one peripheral cutting edge 16a is spaced, for example, forwardly in the feed direction from the other peripheral cutting edge 16c, as shown in FIG. 4. Consequently, the back force Fa exerted on the peripheral cutting edge 16a and the back force Fc' exerted on the peripheral cutting edge 16c cause a shearing force to act on the tool, thereby causing a new vibration to occur, resulting in a poor surface finish. This is especially the case with an end mill which has a comparatively great length of cut relative to the diameter and has a small number of peripheral cutting edges. In such an end mill, the end mill itself is subjected to a bending strain, resulting in poor precision in the width of the finished groove. In the aforementioned end mill, however, since the two peripheral cutting edges 16a and 16c are symmetrical with respect to the axis X of the body, the back forces Fa and Fc are exerted thereon so as to cancel each other, as shown in FIG. 4. Accordingly, the end mill is prevented from being subjected to such a shear stress as to cause a vibration which adversely affects the cutting performance, thereby improving the surface finish.

Figure 5:
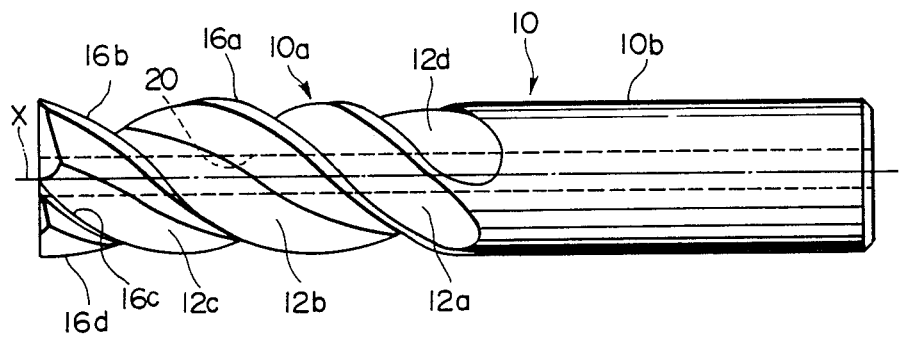
FIG. 5 is a view similar to FIG. 1, but showing a modified cutting tool in accordance with the present invention.
Figure 6:
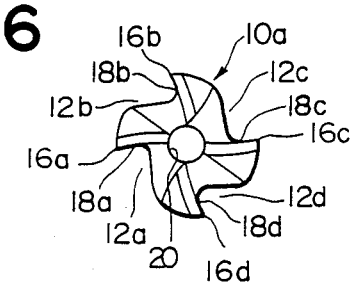
FIG. 6 is a view similar to FIG. 2, but showing the cutting tool of FIG. 5.

FIGS. 5 and 6 show an end mill in accordance with a second embodiment of the present invention which differs from the aforementioned end mill in that an axial bore 20 is formed through and extends coaxially with the body 10, so that the end cutting edges 18a, 18b, 18c and 18d are spaced from the axis X of the body 10 and have the same length.

Figure 7:
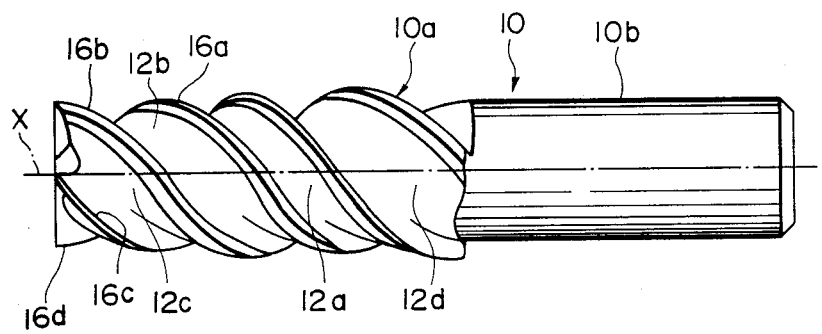
FIG. 7 is a view similar to FIG. 1, but showing another modified cutting tool.
Figure 8:
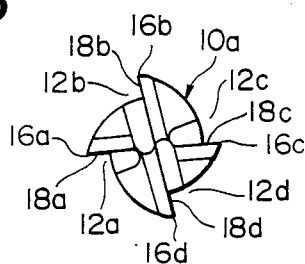
FIG. 8 is a view similar to FIG. 2, but showing the cutting tool of FIG. 7.
Figure 13:
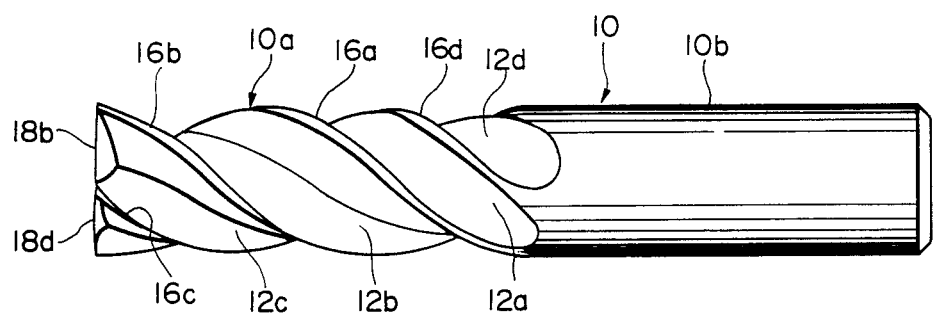
FIG. 13 is a view similar to FIG. 1, but showing a further modified cutting tool.

FIGS. 7 and 8 show an end mill in accordance with a third embodiment of the present invention which differs from the first embodiment in that the end cutting edges 18a, 18b, 18c and 18d are straight when viewed from the forward end of the body 10. The end cutting edges may be convexly arcuate when viewed from the forward end of the body.

FIGS. 9 and 10 show a ball-nose end mill with a hemispherical forward end portion provided in accordance with a fourth embodiment of the present invention.

FIGS. 11 and 12 show a plain milling cutter in accordance with a fifth embodiment of the present invention. The milling cutter includes a body 10c constituting the cutting part and a plurality of first and second helical peripheral cutting edges 16e and 16f formed on a circumferential surface of the body 10c in circumferentially spaced relation to one another, the first and second peripheral cutting edges being disposed alternately. In the illustrated embodiment, the first peripheral cutting edge 16e is provided with a helix angle smaller than that of the second peripheral cutting edge 16f. In addition, the peripheral cutting edges are equally spaced circumferentially of the body in a plane disposed perpendicular to the axis X of the body and passing through midmost points of the respective peripheral cutting edges.

Figure 14:
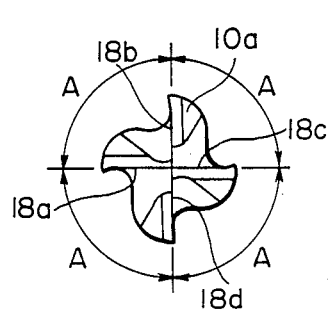
FIG. 14 is a view similar to FIG. 2, but showing the cutting tool of FIG. 13.
Figure 15:
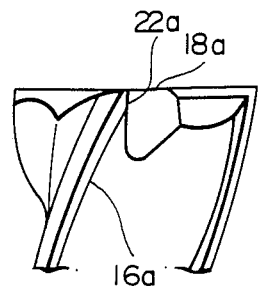
FIG. 15 is an enlarged view of a part of the cutting tool of FIG. 13.
Figure 16:
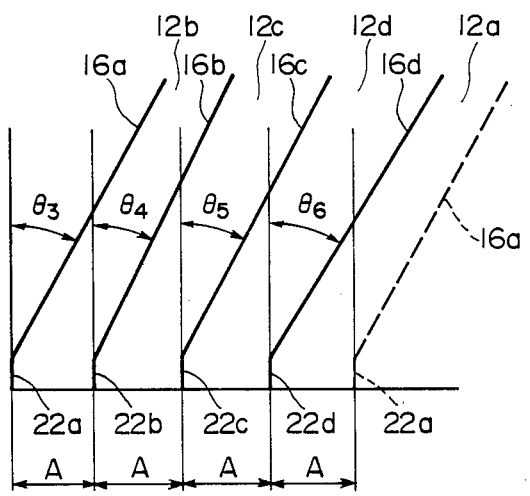
FIG. 16 is a view similar to FIG. 3, but showing the cutting tool of FIG. 13.
Figure 17:
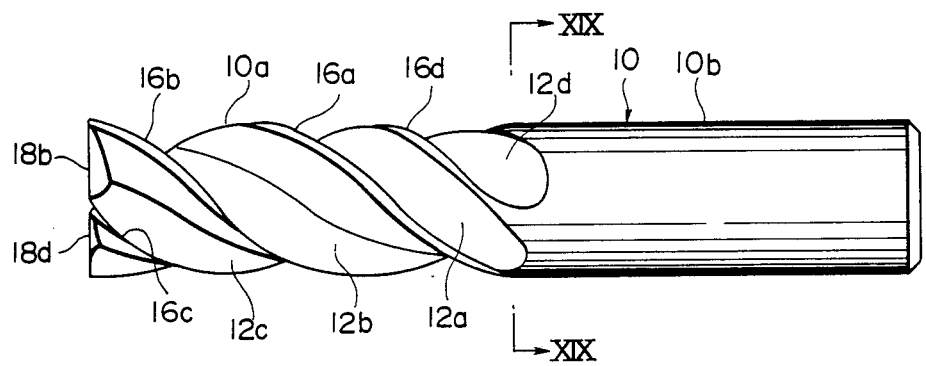
FIG. 17 is a view similar to FIG. 1, but showing a further modified cutting tool.
Figure 18:
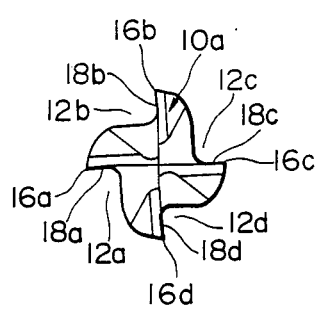
FIG. 18 is a view similar to FIG. 2, but showing the cutting tool of FIG. 17.

FIGS. 13 to 16 show an end mill in accordance with a sixth embodiment of the present invention. The end mill includes the helical peripheral cutting edges 16a, 16b, 16c and 16d each consisting of a long helical cutting edge portion and a short straight cutting edge portion 22a, 22b, 22c, 22d of a length shorter than 1 mm at a forward end thereof. The peripheral cutting edges 16a to 16d are respectively provided with the helix angles $\theta_3$, $\theta_4$, $\theta_5$ and $\theta_6$ different from one another, and are disposed so that imaginary helical edge portions extending forwardly from the helical edge portions are equally spaced circumferentially of the body at the forward end of the body. In order to prevent the width of the flutes 12a to 12d from being decreased unduly at their rearward ends to adversely affect the removability of the chips, the helix angles $\theta_3$ to $\theta_6$ of the peripheral cutting edges 16a to 16d would be preferably selected in a manner that the difference between the greatest one and the smallest one ranges from 1° to 5° for such an end mill having the diameter of 3 mm to 25 mm and the length of cut of three times as long as the diameter. The short cutting edge portions 22a to 22d intersect the end cutting edges 18a to 18d, respectively, and have a slightly positive axial rake angle smaller than the helix angles $\theta_3$ to $\theta_6$. The end cutting edges 18a to 18d as well as the short cutting edge portions 22a to 22d of the peripheral cutting edges are equally spaced circumferentially of the body 10 so as to have the equal pitch A, as shown in FIGS. 14 and 16.

With this construction, by making reference to the disposition of the forward ends of the imaginary helical edge portions of the helical edge portions, the courses of the helical edge portions of the peripheral cutting edges can be easily determined, and therefore the peripheral cutting edges can be formed even more easily than the end mill of FIGS. 1 to 3. In addition, since the end cutting edges 18a to 18d are equally spaced circumferentially of the body 10, the end cutting edges can easily be formed too.

Further, in the case of the prior art end mill, feed marks having unequal intervening spaces might be formed on the finished surface of the workpiece. In the end mill of this embodiment, since the end cutting edges are equally spaced circumferentially of the body, feed marks having equal intervening spaces are formed on the workpiece, so that the appearance of the finished surface of the processed workpiece can be substantially improved. As a result, the end cutting edges and the peripheral cutting edges cooperate with each other to make it possible to obtain excellent surface finish. Such an end mill as described above can be suitably made of cemented carbide or cermet and employed even for the high-speed cutting operation where the end mill is susceptible to vibration and chattering and the cutting edges are susceptible to damage.

Further, inasmuch as the end mill includes the short cutting edge portions 22a to 22d having a small positive axial rake angle, those corner portions where the end cutting edges 18a to 18d and the peripheral cutting edges 16a to 16d intersect are prevented from being subjected to damage.

FIGS. 17 to 20 show an end mill in accordance with a seventh embodiment of the present invention. The end mill includes the helical peripheral cutting edges 16a, 16b, 16c and 16d respectively having helix angles $\theta_7$, $\theta_8$, $\theta_9$ and $\theta_{10}$ different from one another, the helix angles being selected so as to satisfy the following relationship:

$$\theta_7 < \theta_8 < \theta_9 < \theta_{10}$$

Figure 19:
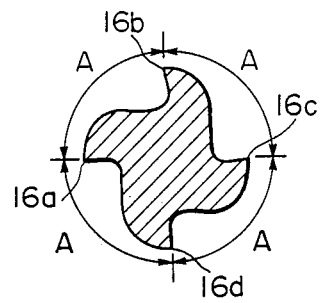
FIG. 19 is a cross-sectional view taken along the line XIX—XIX of FIG. 17.
Figure 20:
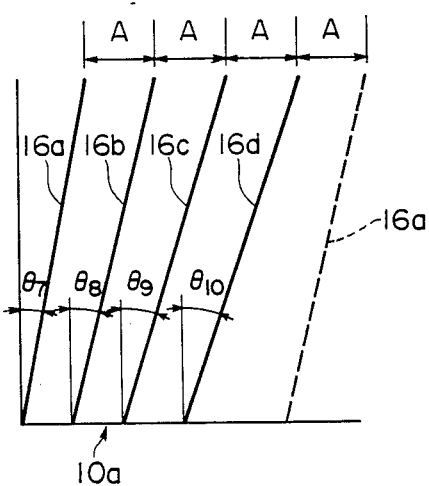
FIG. 20 is a view similar to FIG. 3, but showing the cutting tool of FIG. 17.
Figure 21:
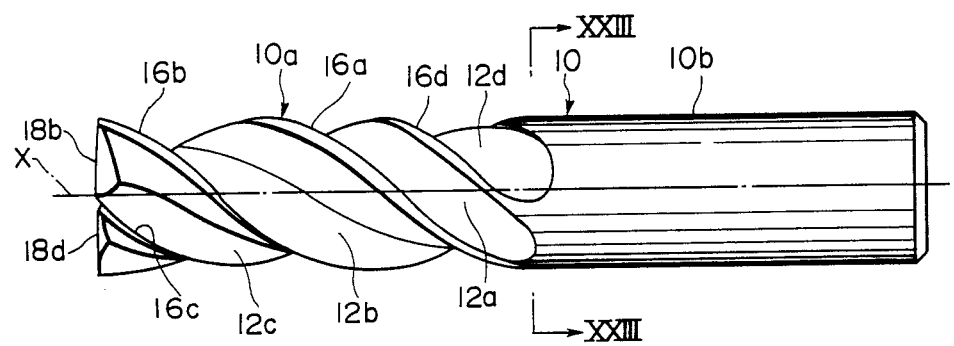
FIG. 21 is a view similar to FIG. 1, but showing a further modified cutting tool.
Figure 22:
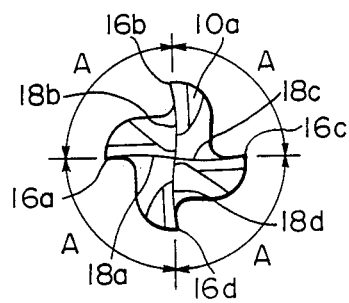
FIG. 22 is a view similar to FIG. 2, but showing the cutting tool of FIG. 21.
Figure 23:
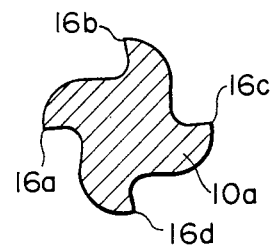
FIG. 23 is a cross-sectional view taken along the line XXIII—XXIII of FIG. 21.
Figure 24:
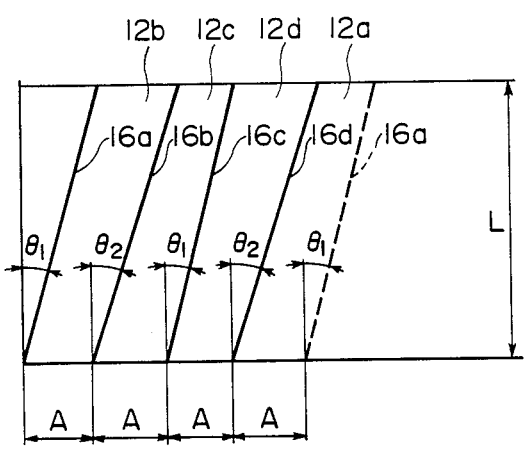
FIG. 24 is a view similar to FIG. 3, but showing the cutting tool of FIG. 21.

The peripheral cutting edges are equally spaced circumferentially of the body at the rearward end of the cutting part 10a so as to have an equal pitch A as shown in FIGS. 19 and 20. Consequently, the flutes have the same width at the rearward end of the cutting portion.

Similarly to the aforementioned embodiment shown in FIGS. 13 to 16, the helix angles of the peripheral cutting edges should be preferably selected in a manner that the difference between the greatest one and the smallest one ranges from 1° to 5° for the end mill having the diameter of 3 mm to 25 mm and the length of cut of three times as long as the diameter.

In this embodiment, the peripheral cutting edges 16a to 16d are equally spaced circumferentially of the body 10 at the rearward end of the cutting part 10a. Accordingly, by making reference to the disposition of the rearward ends of the peripheral cutting edges, the courses of the remaining portions of the peripheral cutting edges can be easily determined, and therefore the peripheral cutting edges can be formed easily. In addition, although bending stress in the circumferential direction concentrates on the rearward end of the cutting part, the rearward end has an increased bending strength in the circumferential direction since the peripheral cutting edges are equally spaced circumferentially of the body at the rearward end of the cutting part. Therefore, the rigidity of the end mill at the rearward end of the cutting part is prevented from being decreased unduly.

In addition, since the forward end portion of the body 10 remote from the shank portion 10b fixedly secured to the machine spindle is subjected to cutting load, the forward end portion is most susceptible to vibration or chattering during cutting operation. In the end mill described above, however, the vibration-isolating effect is greatest at the forward end portion since the circumferential and axial distance between adjacent two peripheral cutting edges varies most remarkably at the forward end portion, Accordingly, the end mill is sufficiently prevented from being subjected to vibration and chattering, thereby achieving excellent cutting performance even for the end mill which is employed for heavy-duty cutting operation or high-feed rate cutting operation. Thus, the end mill described above can be suitably made of cemented carbide or cermet for high-speed cutting operation.

FIGS. 21 to 24 show an end mill in accordance with a eighth embodiment of the present invention which differs from the end mill of FIGS. 1 to 3 in that the helical peripheral cutting edges 16a, 16b, 16c and 16d are equally spaced circumferentially of the body 10 at the forward end of the cutting part 10a, and that the end cutting edges 18a, 18b, 18c and 18d 18d are equally spaced circumferentially of the body.

Figure 25:
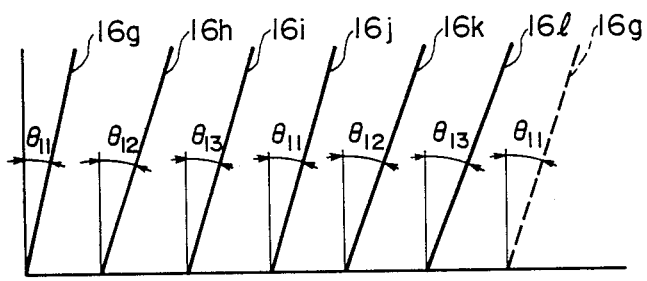
FIGS. 25 to 28 are views similar to FIG. 3, but showing further modified cutting tools, respectively.

FIG. 25 shows a six-flute end mill in accordance with a ninth embodiment of the present invention which includes six helical peripheral cutting edges 16g, 16h, 16i, 16j, 16k and 16l. The peripheral cutting edges 16g to 16l are equally spaced circumferentially of the body 10 at the forward end of the cutting part 10a, and each pair of peripheral cutting edges disposed in diametrically opposite relation are provided with the helix angle $\theta_{11}$, $\theta_{12}$, $\theta_{13}$, the helix angles $\theta_{11}$, $\theta_{12}$ and $\theta_{13}$ being different from each other.

Figure 26:
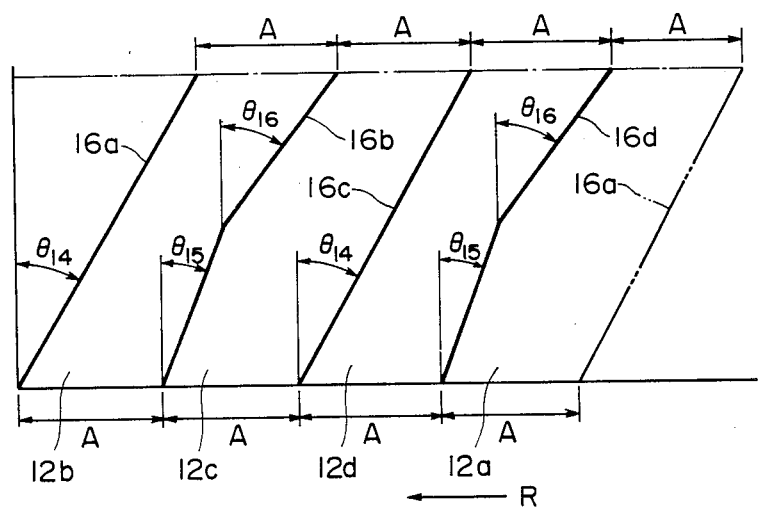

FIG. 26 show an end mill in accordance with a tenth embodiment of the present invention which includes four peripheral cutting edges 16a to 16d spaced equally circumferentially of the body at the forward and rearward ends of the cutting part 10a so as to have the equal pitch A. Among the four peripheral cutting edges, the two peripheral cutting edges 16a and 16c disposed in diametrically opposite relation have the same helix angle $\theta_{14}$ which are uniform along their entire length, and each of the other two peripheral cutting edges 16b and 16d is defined by a helical forward portion with a helix angle $\theta_{15}$ extending from its forward end to its midmost point and a helical rearward portion with a helix angle $\theta_{16}$ extending from its midmost point to its rearward end. The helix angle $\theta_{15}$ is smaller than the helix angles $\theta_{14}$ while the helix angle $\theta_{16}$ is greater than the helix angles $\theta_{14}$, and the helix angles $\theta_{14}$ to $\theta_{16}$ are selected so as to satisfy the following relationship:

$$\theta_{16} - \theta_{14} = \theta_{14} - \theta_{15}$$

As compared with an end mill wherein the peripheral cutting edges 16b and 16d have the uniform helix angle $\theta_{15}$ or $\theta_{16}$ along the entire length, the width of the flutes can be maintained great enough to permit the chips produced during cutting operation to be smoothly removed. In addition, as compared with an end mill wherein the helix angles of the peripheral cutting edges are uniform along their entire length, the difference $(\theta_{16} - \theta_{14})$ or $(\theta_{14} - \theta_{15})$ between the helix angles of the adjacent two peripheral cutting edges can be made about twice as large as that for the end mill wherein each peripheral cutting edge has the uniform helix angle along the entire length thereof, and therefore the vibration of the end mill can be prevented more definitely.

Figure 27:
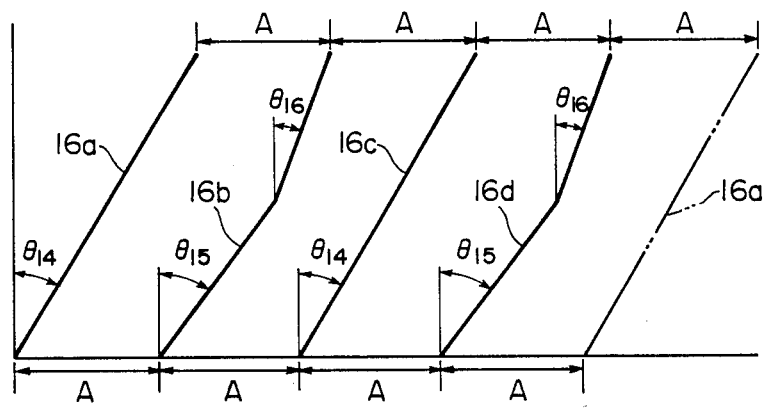

FIG. 27 shows an end mill in accordance with an eleventh embodiment of the present invention which differs from the end mill of FIG. 26 in that the helix angle $\theta_{15}$ is greater than the helix angle $\theta_{14}$ while the helix angle $\theta_{16}$ is smaller than the helix angles $\theta_{14}$, and that the helix angles are selected so as to satisfy the following relationship:

$$\theta_{15} - \theta_{14} = \theta_{14} - \theta_{16}$$

Figure 28:
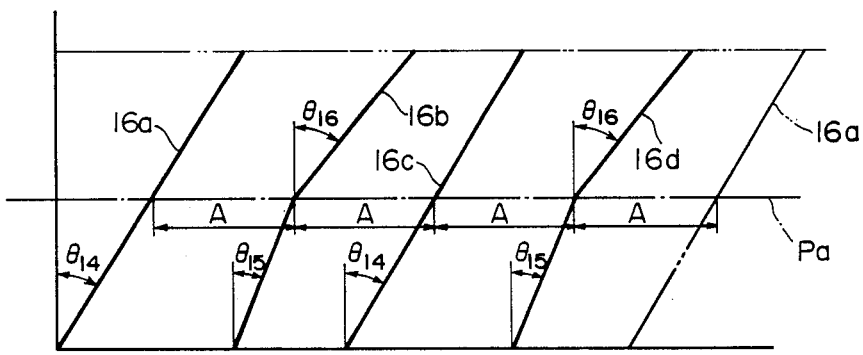

FIG. 28 shows an end mill in accordance with a twelfth embodiment of the present invention which differs from the end mill of FIG. 26 in that the four peripheral cutting edges are equally spaced circumferentially of the body in a plane Pa intersecting the central portion of the respective peripheral cutting edges where the first and second portions thereof intersect each other.

While the rotary cutting tools according to the present invention have been specifically shown and described herein, the invention itself is not to be restricted by the exact showings or the description thereof. For example, although in the illustrated embodiments, the end mill includes four or six peripheral cutting edges, the end mill may include two or any other plural number of peripheral cutting edges. In the embodiment shown in FIGS. 1 to 3, the plane P is disposed so as to be spaced a distance of one third of the length of cut from the forward end thereof. The plane, however, may be preferably disposed at the midmost point of the actually-used portion of the cutting part or at a position slightly spaced forwardly from the midmost point. Or, in view of the fact that the end mill becomes shorter when subjected to dressing, the plane may be disposed at a position spaced rearwardly from the midmost point. In addition, in the embodiment shown in FIG. 28, the plane Pa may be disposed between the forward ends of the peripheral cutting edges and the midmost points thereof. With regards to the helix angles of the plurality of peripheral cutting edges, only one of the peripheral cutting edges may have a different helix angle from those of the other cutting edges. Also, the end mill may be a brazed end mill wherein the cutting tips are brazed to the body. Further, although in the aforementioned embodiments, the peripheral cutting edges are spiral in right hand direction and have positive rake angles, they may be spiral in left hand direction, and may have negative rake angles.

What is claimed is:

1. In an improved rotary cutting tool comprising a body having a cutting part and an axis of rotation therethrough, said body having an even number of helical flutes formed in a circumferential surface of the cutting part in circumferentially spaced relation to one another and extending helically axially of the cutting part so as to define an even number of helical lands of a generally uniform land width spaced circumferentially of the cutting part from one another, said body having an even number of helical peripheral cutting edges each defined by a portion of an inner surface of a respective one of the helical flutes facing in a direction of rotation of the body and a surface of the land adjacent to said portion of the inner surface, at least one of said peripheral cutting edges having a helix angle different from helix angles of the other peripheral cutting edges, the improvement comprising:

the even number of peripheral cutting edges being equally spaced circumferentially of the body in at least one plane disposed perpendicular to the axis of rotation of the body, said plane being spaced a distance of about one third of the length of the cutting part from the forward end thereof, the even number of peripheral cutting edges being comprised of a plurality of pairs of diametrically opposite cutting edges, the two peripheral cutting edges of each of said pairs of cutting edges having the same helix angle and thereby being symmetrical with respect to the axis of the body.

2. A rotary cutting tool according to claim 1, in which said cutting part includes a forward end face and an even number of end cutting edges formed on the forward end face, each of said end cutting edges having an outer end intersecting a respective one of the peripheral cutting edges and extending radially inwardly of the body toward the axis of rotation of the body.

3. A rotary cutting tool according to claim 2, in which each of said end cutting edges is concavely curved when viewed from the forward end face of the body.

4. A rotary cutting tool according to claim 2, in which each of said end cutting edges is convexly curved when viewed from the forward end face of the body.

5. A rotary cutting tool according to claim 2, in which each of said end cutting edges is straight when viewed from the forward end face of the body.

6. A rotary cutting tool according to claim 2, in which said body includes an axial bore formed therethrough so as to extend coaxially therewith.

7. A rotary cutting tool according to claim 2, comprising a ball end mill.

8. In an improved rotary cutting tool comprising a body having a cutting part and an axis of rotation therethrough, said body having an even number of helical flutes formed in a circumferential surface of the cutting part in circumferentially spaced relation to one another and extending helically axially of the cutting part so as to define an even number of helical lands of a generally uniform land width spaced circumferentially of the cutting part from one another, said body having an even number of helical peripheral cutting edges each defined by a portion of an inner surface of a respective one of the helical flutes facing in a direction of rotation of the body and a surface of the land adjacent to said portion of the inner surface, at least one of said peripheral cutting edges having a helix angle different from helix angles of the other peripheral cutting edges, the improvement comprising:

the even number of peripheral cutting edges being equally spaced circumferentially of the body in at least one plane disposed perpendicular to the axis of rotation of the body, the even number of peripheral cutting edges being comprised of a plurality of pairs of diametrically opposite cutting edges, the two peripheral cutting edges of each of said pairs of cutting edges having the same helix angle and thereby being symmetrical with respect to the axis of the body, and said even number of peripheral cutting edges includes a plurality of pairs of adjacent peripheral cutting edges, a first cutting edge of each of said pairs of adjacent cutting edges having a uniform helix angle along the entire length of said first cutting edge, a second cutting edge of each of said pairs of adjacent cutting edges including a forward portion having a forward helix angle and a rearward portion having a rearward helix angle different than the forward helix angle of said second cutting edge.

9. A rotary cutting tool according to claim 8, in which said peripheral cutting edges are equally spaced circumferentially of the body in the plane disposed between the forward end of the body and a point passing through the cutting part centrally of the length thereof, the forward and rearward portions of the second peripheral cutting edge intersecting in said plane.

10. A rotary cutting tool according to claim 8, in which the helix angles of the first and second peripheral cutting edges are selected so that the difference between the helix angle of the first peripheral cutting edge and the helix angle of the forward portion of the second peripheral cutting edge is equal to the difference between the helix angle of the first peripheral cutting edge and the helix angle of the rearward portion of the second peripheral cutting edge.

11. A rotary cutting tool according to claim 10, in which said peripheral cutting edges are equally spaced circumferentially of the body in the plane disposed between the forward end of the body and a point passing through the cutting part centrally of the length thereof, the forward and rearward portions of the second peripheral cutting edge intersecting in said plane.

12. A rotary cutting tool according to claim 10, in which said peripheral cutting edges are equally spaced circumferentially of the body in the planes disposed at the forward and rearward ends of the cutting part.

13. A rotary cutting tool according to claim 10, in which said peripheral cutting edges are equally spaced circumferentially of the body in the plane passing through the cutting part centrally of the length thereof, the forward and rearward portions of the second peripheral cutting edge intersecting in said plane.

14. A rotary cutting tool according to claim 8, in which said peripheral cutting edges are equally spaced circumferentially of the body in the planes disposed at the forward and rearward ends of the cutting part.

15. A rotary cutting tool according to claim 8, wherein, in each of said pairs of adjacent cutting edges, the forward helix angle of the second cutting edge of the pair is smaller than the helix angle of the first cutting edge of said pair, while the rearward helix angle of the second cutting edge of the pair is greater than the helix angle of the first cutting edge of said pair.

16. A rotary cutting tool according to claim 8, wherein, in each of said pairs of adjacent cutting edges, the forward helix angle of the second cutting edge of the pair is greater than the helix angle of the first cutting edge of said pair, while the rearward helix angle of the second cutting edge of the pair is less than the helix angle of the first cutting edge of said pair.

17. A rotary cutting tool according to claim 8, in which said peripheral cutting edges are equally spaced circumferentially of the body in the plane passing through the cutting part centrally of the length thereof, the forward and rearward portions of the second peripheral cutting edge intersecting in said plane.

18. In an improved rotary cutting tool comprising a body having a cutting part and an axis of rotation therethrough, said body having an even number of helical flutes formed in a circumferential surface of the cutting part in circumferentially spaced relation to one another and extending helically axially of the cutting part so as to define an even number of helical lands of a generally uniform land width spaced circumferentially of the cutting part from one another, said body having an even number of helical peripheral cutting edges each defined by a portion of an inner surface of a respective one of the helical flutes facing in a direction of rotation of the body and a surface of the land adjacent to said portion of the inner surface, at least one of said peripheral cutting edges having a helix angle different from helix angles of the other peripheral cutting edges, the improvement comprising:

the even number of peripheral cutting edges being equally spaced circumferentially of the body in at least one plane disposed perpendicular to the axis of rotation of the body, the even number of peripheral cutting edges being comprised of a plurality of pairs of diametrically opposite cutting edges, the two peripheral cutting edges of each of said pairs of cutting edges having the same helix angle and thereby being symmetrical with respect to the axis of the body, and each of said peripheral cutting edges including (i) a helical cutting edge portion with said helix angle of the cutting edge and (ii) a short cutting edge portion at a forward end thereof having a positive axial rake angle smaller than the helix angle of the cutting edge.

19. A rotary cutting tool according to claim 18, in which said end cutting edges are equally spaced circumferentially of the body.

20. In an improved rotary cutting tool comprising a body having a cutting part and an axis of rotation therethrough, said body having an even number of helical flutes formed in a circumferential surface of the cutting part in circumferentially spaced relation to one another and extending helically axially of the cutting part so as to define an even number of helical lands of a generally uniform land width spaced circumferentially of the cutting part from one another, said body having an even number of helical peripheral cutting edges each defined by a portion of an inner surface of a respective one of the helical flutes facing in a direction of rotation of the body and a surface of the land adjacent to said portion of the inner surface, at least one of said peripheral cutting edges having a helix angle different from helix angles of the other peripheral cutting edges, the improvement comprising:

the even number of peripheral cutting edges being equally spaced circumferentially of the body in at least one plane disposed perpendicular to the axis of rotation of the body, the even number of peripheral cutting edges being comprised of a plurality of pairs of diametrically opposite cutting edges, the two peripheral cutting edges of each of said pairs of cutting edges having the same helix angle and thereby being symmetrical with respect to the axis of the body, and each flute having a uniform radial depth over substantially the entire axial length of the flute.

21. A rotary cutting tool according to claim 20, wherein said plane is disposed in the forward one-half of the cutting part.

22. A rotary cutting tool according to claim 21, wherein said plane is spaced a distance of about one third of the length of the cutting part from the forward end thereof.

* * * * *